US011526756B1

(12) United States Patent
Arici et al.

(10) Patent No.: US 11,526,756 B1
(45) Date of Patent: Dec. 13, 2022

(54) ARTIFICIAL INTELLIGENCE SYSTEM WITH COMPOSITE MODELS FOR MULTIPLE RESPONSE-STRING QUERIES

(71) Applicant: Amazon Technologies, Inc., Seattle, WA (US)

(72) Inventors: Tarik Arici, New York, NY (US); Ismail Baha Tutar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 337 days.

(21) Appl. No.: 16/910,868

(22) Filed: Jun. 24, 2020

(51) Int. Cl.
*G06N 3/08* (2006.01)
*G06F 16/28* (2019.01)
*G06N 3/04* (2006.01)

(52) U.S. Cl.
CPC .............. *G06N 3/08* (2013.01); *G06F 16/285* (2019.01); *G06N 3/0454* (2013.01)

(58) Field of Classification Search
CPC ....... G06N 3/08; G06N 3/0454; G06F 16/285
USPC .......................................................... 706/20
See application file for complete search history.

(56) References Cited

U.S. PATENT DOCUMENTS

| 8,065,290 | B2* | 11/2011 | Hogue | G06F 16/951 707/706 |
| 9,766,856 | B2* | 9/2017 | Yehaskel | G06F 16/33 |
| 10,452,992 | B2* | 10/2019 | Lee | G06N 20/00 |
| 10,606,846 | B2 | 3/2020 | Li et al. | |
| 2014/0280193 | A1* | 9/2014 | Cronin | G06N 20/00 707/741 |
| 2015/0379429 | A1* | 12/2015 | Lee | G09B 5/00 706/11 |
| 2015/0379430 | A1* | 12/2015 | Dirac | G06N 20/00 706/12 |
| 2016/0180245 | A1* | 6/2016 | Tereshkov | G06N 20/00 706/12 |
| 2017/0024645 | A1 | 1/2017 | Socher et al. | |
| 2018/0129938 | A1 | 5/2018 | Xiong et al. | |
| 2018/0276525 | A1 | 9/2018 | Jiang et al. | |
| 2019/0377747 | A1 | 12/2019 | Fan et al. | |

OTHER PUBLICATIONS

Xiang Zhang et al., "Character-level Convolutional Networks for Text Classification", arXiv:1509.01626v3, Apr. 4, 2016, pp. 1-9.

(Continued)

*Primary Examiner* — Juan A Torres
(74) *Attorney, Agent, or Firm* — Robert C. Kowert; Kowert, Hood, Munyon, Rankin & Goetzel, P.C.

(57) ABSTRACT

Query types for which responses are to be generated with respect to records comprising text attributes are identified, including a text interpretation query type for which records may comprise one or more response-contributor strings. Results of the text interpretation query for a record are based at least partly on an extracted-property class of the records. A machine learning model comprising a first sub-model and a second sub-model is trained to extract results of the text interpretation query. The first sub-model generates an extracted-property class for a record, and the second sub-model predicts positions of response-contributor strings within the record based at least in part on the extracted-property class. A trained version of the model is stored.

20 Claims, 10 Drawing Sheets

(56) References Cited

OTHER PUBLICATIONS

Pranav Rajpurkar et al., "SQuAD: 100,000+ Questions for Machine Comprehension for Text", arXiv:1606.05250v3, Oct. 11, 2016, pp. 1-10.
Minjoon Seo et al., "Bi-Directional Attention Flow for Machine Compression", arXiv:1611.01603v6, Jun. 21, 2018, pp. 1-13.
Jacob Devlin et al., "BERT: Pre-training of Deep Bidirectional Transformers for Language Understanding", arXiv:1810.04805v2, May 24, 2019, pp. 1-16.
Mandar Joshi et al., "SpanBert: Improving Pre-training by Representing and Predicting Spans", arXiv:1907.10529v3, Jan. 18, 2020, pp. 1-13.
Preena M P et al., Question Answering Using Deep Learning, International Conference on Systems Energy and Environment (ICSEE2019), Jul. 2019, Retrieved from http://ssrn.com/link/ICSEE-2019.html, pp. 1-5.

\* cited by examiner

UMC-dependent strings to be extracted to determine UQ (and hence PPU) are shown in ellipses Table 200

| Text attribute 210 | Unit measurement category (UMC) 212 | Total unit quantity (UQ) 214 | Price-per-unit (PPU) 216 |
|---|---|---|---|
| <SupplierX> Original Organic Ground Coffee, Caffeinated, <Cup-name> cups, (36) ct – 12.4 oz box, pack of (2) | Count | 72 (36*2) | Total price/UQ |
| <SupplierY> Shade-grown Coffee Beans, Decaf, (10) ct – (500) gram box, pack of (2) | Weight in kg | 10 (10*500*2/1000) | |
| <SupplierK> Super-fresh leaf hot tea bags, (16) ct, 1.4 oz (pack of (6)) | Count | 96 (16*6) | |
| <SupplierL> Assam loose black tea, (250) gram box, (8)-pack | Weight in kg | 2 (250*8/1000) | |

Record 220A ↑ (row 1)
Record 220B ↑ (row 2)
Record 220C ↑ (row 3)
Record 220D ↑ (row 4)

FIG. 2

Welcome to the catalog entry submission tool!

Enter data for your entry below. The tool will automatically extract values to fill out entries when possible; you can verify the extracted values in the next step. 502

| 504 | 506 |
|---|---|
| Title | MNOP pure loose leaf black tea, 100 gm., 6 pack |

| 508 | 510 |
|---|---|
| Measurement unit category | ▼ |

| 512 | 514 |
|---|---|
| Size per unit | |

| 516 | 518 |
|---|---|
| Number of units | |

| 520 | 522 |
|---|---|
| Total unit quantity | |

...

Next  550

FIG. 5

ARTIFICIAL INTELLIGENCE SYSTEM WITH COMPOSITE MODELS FOR MULTIPLE RESPONSE-STRING QUERIES

BACKGROUND

In recent years, more and more raw data that can potentially be utilized for solving complex analytics problems is being collected from a large variety of sources, such as sensors of various kinds including medical equipment, store catalog entries, web server logs, social media services, financial transaction records, security cameras, and the like. A variety of analytics techniques, including machine learning, statistics, graph theory and the like can be combined to create algorithms that can solve problems in various domains such as natural language processing, financial fraud detection, human health diagnosis and the like.

In many cases, the records to be analyzed can contain attributes expressed in unstructured text. For example, some records of a catalog may contain an item title, an item descriptor, bullet points highlighting important properties of the item, and so on. Individuals submitting the records for inclusion in the catalog may sometimes do so in inconsistent ways—e.g., incorporating a substantial portion of a description in the title, including contradictory information in different attributes, leaving some attributes blank, and so on. The organizations which store the records and implement applications which access the records may have to deal with mitigating such inconsistencies.

A number of different types of queries may have to be processed at a repository of such records for some applications. Often, the answer to a given query with respect to a given record may be hard to determine by a straightforward analysis of the text contained in the record—e.g., because of differences in the way the information within text attributes is conveyed by respective sources of the records, no easily-detectable single substring by itself may be sufficient to respond to the query. Queries whose responses may potentially require the combination of several different substrings are referred to as multiple response-string queries or multi-answer queries. Generating responses to such queries remains a non-trivial technical problem.

BRIEF DESCRIPTION OF DRAWINGS

FIG. 2 illustrates example text attributes of records for which price-per-unit computations may require identification of multiple substrings, according to at least some embodiments.

FIG. 5 and FIG. 6 collectively illustrate example graphical user interfaces which may be used to automatically fill out catalog entry submission form elements using a trained composite model for record content interpretation and extraction, according to at least some embodiments.

Figure 1:
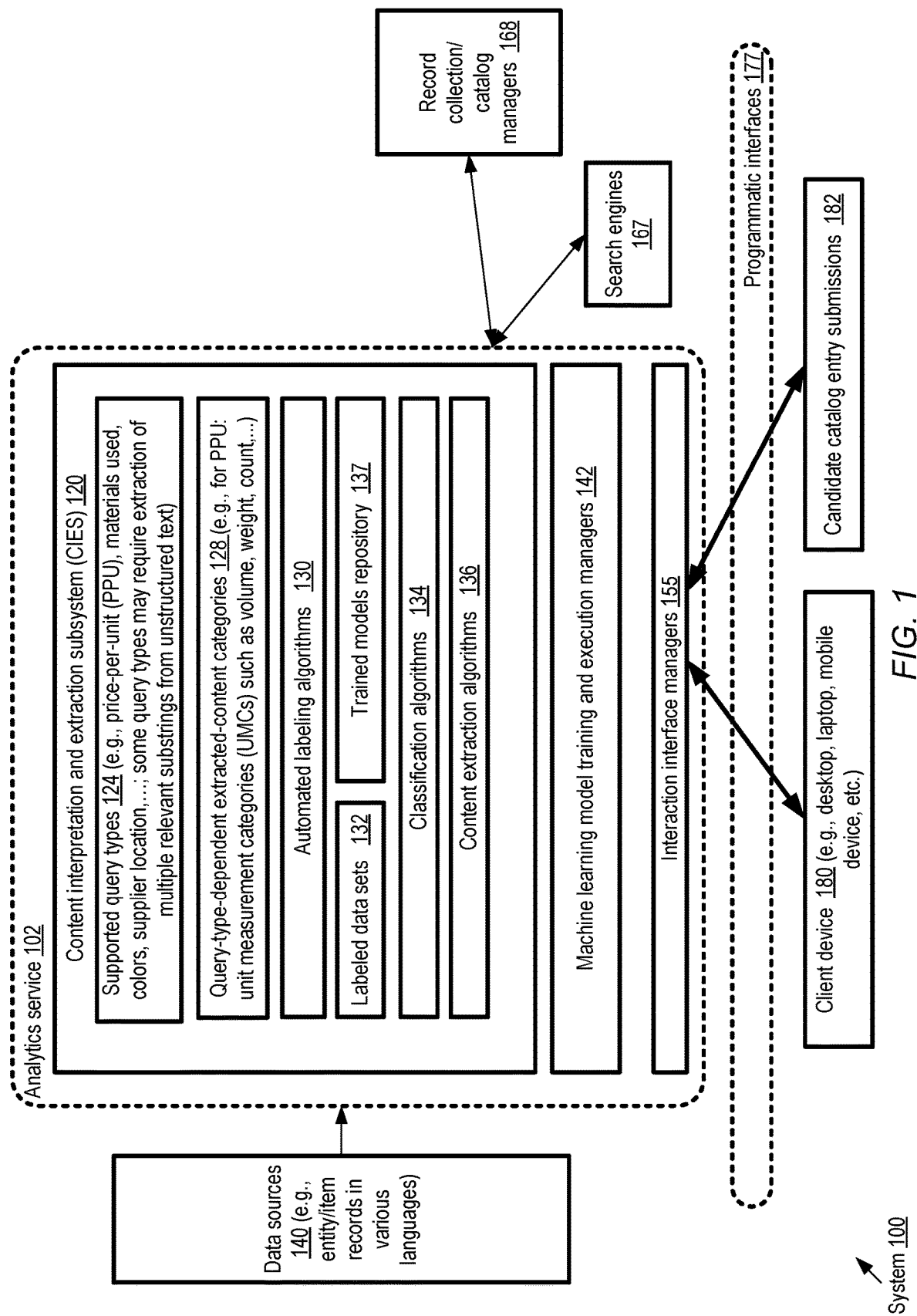
FIG. 1 illustrates an example system environment in which techniques for record content interpretation and extraction may be implemented at an analytics service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for generating responses to queries which may require the extraction of multiple substrings from within text attributes of entity records, using composite lightweight machine learning models comprising a classifier sub-model and an extractor sub-model. Generally speaking, an entity record may be intended to be used to represent or capture various characteristics of a real-world object, item or person. Individual entity records to which the queries are directed (such as records of a catalog of an online or brick-and-mortar store, medical records, financial records and the like) may comprise a plurality of attributes, including at least some text attributes. The proposed techniques includes the analysis of the text attributes to determine query responses, although non-text attributes may also be used in part of the analysis in some embodiments.

In order to better explain the proposed techniques, it may be helpful to consider a concrete use case, in which individual entity records represent respective entries of a store's catalog, such as an online catalog which can be browsed or searched via programmatic interfaces, and from which potential customers may select items for purchase (or for inclusion in a wish list or the like). The catalog entries may be submitted or generated, for example, based on information submitted programmatically by the sellers or vendors of the items. At least some such catalog records may describe, in addition to a particular physical or digital item, the manner in which the item is packaged or grouped for purchasing by potential consumers. For example, a catalog record for chocolates may include an attribute comprising the text "one dozen 4-ounce bars", another catalog record for a similar type of chocolate may include an attribute comprising the text "20 bars, 100 grams each" and so on. Because they contain information about the amounts and/or count of the underlying items which are packaged or combined together, such catalog records may also be referred to as packaging records. Each such catalog entry may also include a respective price for the items packaged together in the entry. In order to make more informed buying decisions, it may be helpful for consumers to be provided a "price-per-unit" (PPU) metric for similar catalog packaging records, in effect (in the chocolate example) answering questions similar to "How much does one ounce of this chocolate cost?" for each packaging record representing qualitatively similar chocolates. Price-per-unit queries represents one common type of query in the case of applications associated with product catalogs or item catalogs. Other query types may be directed toward the materials used for the real-world entities represented by a record—e.g., in the case of records pertaining to a hardware store, a material query may in effect ask "What is the primary material used in this item—wood, plastic, metal, or some other material?"

In order to respond to a PPU query with respect to a packaging record, a unit measurement category may first have to be determined—e.g., is the "unit" (the "U" of the PPU) a unit of volume (and if so, what specific volume unit is it—fluid ounces, cubic centimeters, etc.?), a unit of weight (and if so, what specific weight unit is it?), a count, and so on. Depending on the semantics of the packaging record attributes, different measurement unit categories (UMCs) such as weight, volume, area, count and the like may apply, and different specific units of the category (e.g., grams, ounces, kilograms, pounds, etc. in the case of weight) may have to be identified. The determination of the UMC, or more generally the category of the extracted properties of the packaging record which can be used to respond to a query, can be considered a classification problem, with a typically (but not necessarily) small set of possible classes pertinent to the query type from which the category has to be chosen for individual packaging records. Once the unit measurement category is determined for a PPU query directed to a packaging record, the specific unit (such as kilograms or pounds) may be determined in any of several ways—e.g., based on the norms/traditions of the area in which the query originates, based on applicable laws/regulations, based on internal policies of the organization responsible for providing responses to PPU queries, and so on. After the UMC is determined, the contents of the attributes of the record may be examined, and one or more relevant substrings that can be used to determine a total unit quantity (UQ) for each packaging record may be extracted from the attributes. This step may be referred to as relevant content extraction.

In the novel methodology proposed herein, a composite or end-to-end model which includes (a) a classifier sub-model for predicting the extracted-property category (e.g., the UMC in the case of PPU queries) of a record and (b) an extractor sub-model which identifies the positions of relevant substrings from text attributes of the record may be trained to determine the responses to queries. The input to both sub-models may comprise some or all of the text attributes of the records. In at least some embodiments one or more types of neural networks (e.g., including convolutional neural networks or CNNs) may be used for one or both sub-models. One or both sub-models may include character-level embedding layers in various embodiments. Using character-level embeddings, instead of word-level embeddings (or even higher-level embeddings such as n-gram embeddings, attribute-level embeddings, etc.) as is often done in text analysis, has the benefit that the dependence on specific vocabularies is reduced; this may be helpful in problem domains in which the distributions of words differs substantially from the distribution of words in commonly-used corpora traditionally used for preparing machine learning for natural language processing. Using character-level embeddings can also help make the proposed composite model more robust with respect to small errors/misspellings in the input text attributes, and make the composite model language agnostic. The classifier sub-model may include an attention layer in at least some embodiments, which assigns respective weights indicative of the learned relevance of different text attributes.

In at least some embodiments, the output of the classifier (the predicted extracted-property category, such as volume, weight, count etc. in the case of the PPU) for a given record may be included in the input of the extractor sub-model, along with the text attributes of the records. The extractor sub-model may comprise respective neural networks (e.g., CNNs) for identifying start-index and end-index values for substrings that may be needed to respond to the query for a record in various embodiments, given the predicted extracted-property category. For example, in order to compute a PPU, starting and ending positions of strings within text attributes that represent numbers to be multiplied together to compute a total unit quantity (e.g., the total number of grams, or the total number of cubic centimeters) may be identified with the help of the extraction model. Once the relevant substrings are extracted, the remaining computations may be performed to obtain the final response to the query—e.g., the price of a catalog entry may be divided by the total unit quantity. Compared to some types of models used for text analysis, the composite model may have to learn a relatively small number of parameters. Because of the small number of parameters and the use of character-level embeddings (as opposed to multiple types of embeddings or embeddings of higher-level text constructs such as words), the model may be referred to as a lightweight model in some embodiments. As a benefit of the simplicity of the model, the data sets needed for training the model need not be very large, and training the model may be efficient in terms of time and resources in at least some embodiments.

In addition to PPU queries, a variety of other types of queries (some of which may also require extraction of multiple substrings from text attributes of entity records) may also be processed in different embodiments using composite models of the kind introduced above. The proposed technique is not restricted to any particular query or query type, and may be considered part of a general question-and-answer framework for text-containing records. The query types for which the technique may be applied may be described as text interpretation or text analysis queries (although the records for which query results are obtained may also contain non-text attributes in at least some embodiments, and such non-text attributes may also be analyzed to respond to the queries in some cases). Some queries (such as PPU queries) processed using the proposed technique may be quantitative, while others (such as queries about composition or materials used) may be non-quantitative. Generally speaking, in order to respond to a query, one or more lower-level questions may first have to be framed or composed (which may depend on the semantics of the record contents and on factors such as applicable policies or regulations), and then those questions may have to be answered by extracting relevant substrings from the text of the records. The classifier sub-model of the composite model may learn how to generate the right questions (e.g., "What is the total volume of all the individual items packaged together?" Or "What is the total weight of all the individual items packaged together?"), and the extractor sub-model may learn how to extract the right text portions to answer the questions.

As one skilled in the art will appreciate in light of this disclosure, certain embodiments may be capable of achieving various advantages, including some or all of the following: (a) efficiently providing high-quality results for searches directed at record repositories which include text attributes, especially in scenarios in which the search parameters require the interpretation of multiple portions of the record text, (b) detecting submissions of error-containing or inconsistent records for inclusion in a repository or catalog near-instantaneously, thereby reducing the amount of computing and other resources which may otherwise have been required for correcting the errors/inconsistencies, and/or (c) improving the user experience of record submitters, e.g., by automatically filling out remaining portions of the submission forms/interfaces based on non-trivial real-time analysis of text entered earlier.

According to some embodiments, a system may comprise one or more computing devices. The computing devices may include instructions that upon execution on or across the one or more computing devices cause the one or more computing devices to identify one or more query types for which responses are to be generated with respect to respective packaging records of a collection or catalog of packaging records, wherein individual ones of the packaging records (a) represent a respective packaging arrangement of an item and (b) include one or more text attributes, and wherein the one or more query types includes a price-per-unit (PPU) query type. The computing devices may also determine a set of unit measurement categories (UMCs) for items whose packaging arrangements are represented in the collection, such as weight, volume and count. In at least some embodiments, the query types and/or the UMCs may be indicated by clients of an analytics service via programmatic interfaces. Packaging arrangements may also be referred to as grouping arrangements in various embodiments.

A first labeled data set comprising a first plurality of packaging records may be obtained in various embodiments. Labels of the packaging records indicated included in the first data set may include, for example, respective UMCs used to determine a PPU of an item whose packaging arrangement is indicated in the corresponding packaging records. In at least some embodiments, the labels for the first data set may be obtained from a set of annotators via programmatic interfaces. A second labeled data set, comprising a subset of the first plurality of packaging records, may also be obtained in some embodiments. A label of a packaging record of the second labeled data set may indicate one or more quantity-indicator strings within a text attribute of the packaging record. A PPU of an item whose packaging arrangement is indicated in the packaging record may be based at least in part on a total unit quantity (UQ) obtained using the quantity indicator strings, e.g., by multiplying or otherwise aggregating the numbers represented by the quantity-indicator strings.

A composite machine learning model, comprising a first and second sub-model, may be trained to predict at least a respective total UQ for respective packaging records in at least some embodiments. The first sub-model, which may comprise a classifier, may be trained using the first labeled data set. Output generated by the first sub-model for a given input packaging record may comprise a predicted UMC of the input packaging record. Any of a variety of machine learning algorithms may be employed in the first sub-model in different embodiments, including neural network based algorithms and/or algorithms which do not use neural networks (such as decision-tree based algorithms). In at least some embodiments, the first sub-model may comprise a first character-level embedding layer and an attention layer. The attention layer may produce an attention vector whose elements indicate respective relative levels of importance assigned to individual attributes of the input packaging record. In at least some embodiments, the first sub-model may not include a word-level (or text token-level) embedding layer or an embedding layer for higher-level constructs such as n-grams, attributes considered as a whole, or the like.

The second sub-model may be trained using (a) the second labeled data set and (b) UMC predictions generated by the first sub-model in at least some embodiments. The second sub-model, which may be referred to as the extractor sub-model, may identify, with respect to one or more text attributes of an input packaging record, respective start-index positions and end-index positions for one or more quantity-indicator strings used to determine a total unit quantity for the input packaging record. The start-index position of a string within a text attribute may indicate the ordinal position of the first character of the string within an array of characters derived from the attribute, while the end-index position may indicate the ordinal position of the last character of the string within the array of characters. Thus, for example, if a text attribute contains the following: "Pack of 16, 6 oz. each", the following array of characters may be constructed in one implementation: ["P", "a", "c", "k", " ", "o", "f", " ", "1", "6", ",", " ", "6", " ", "o", "z", ".", " ", "e", "a", "c", "h"]. In this example the quantity-indicator strings would include "16" and "6". The start-index position of the first quantity-indicator string (assuming indexing starts at 0 for "P") would be 8, and the end-index position of the first quantity-indicator string would be 9. The start-index position of the second quantity-indicator string would be 12, and the end-index position of the second quantity-indicator string would also be 12. In other implementations, in which for example punctuation and/or whitespaces are eliminated, the start and end index positions may differ. In some implementations, one or both of the sub-models may include convolutional neural network (CNN) layers, and/or softmax layers.

In some embodiments, the first sub-model may be trained by itself in a first stage of training of the composite model, and the second sub-model may be trained with the help of the output produced by the trained version of the first sub-model. In other embodiments, both sub-models may be trained jointly. A trained version of the composite model may be stored, e.g., at a repository of an analytics service in some embodiments. Using the trained version of the composite model, PPUs corresponding to various input packaging records may be obtained and presented/transmitted via programmatic interfaces to one or more destinations such as programs used to manage catalog entries and entry submissions.

The techniques described above may also be employed for other types of quantitative queries (i.e., queries which are not directed to PPUs, but also involve extraction of numeric information) and/or non-quantitative queries in various embodiments. In one embodiment, for example, a computer-implemented method may comprise identifying one or more query types for which responses are to be generated with respect to respective records including a quantity extraction query type for which at least some records comprise a plurality of quantity-indicator strings. A composite machine learning model which extracts a respective result for the quantity extraction query type for a plurality of records may be trained as part of the method. The composite model may comprise a first sub-model and a second sub-model in various embodiments. The output generated by the first sub-model corresponding to an input record may comprise a predicted UMC corresponding to the input record, and the first sub-model may comprise a character-level embedding layer. Input of the second sub-model may comprise UMC predictions generated as output by the first sub-model, and the second sub-model may predict respective start-index positions and end-index positions for one or more quantity-indicator strings within an input record. The computer-implemented method may comprise storing the composite model. Respective composite models may be trained and executed for different types of queries in at least some embodiments, regardless of whether the queries are all directed to the same types of entity records or to different types of entity records (i.e. entity records which have different schemas or attributes). For embodiments in which responses to qualitative or non-quantitative queries are generated, the relevant strings identified in the composite model may be referred to as non-quantitative result indicator strings.

According to some embodiments, one or more non-transitory computer-accessible storage media may store program instructions that when executed on or across one or more processors cause the one or more processors to identify one or more query types for which responses are to be generated with respect to respective records. Individual ones of the records may include one or more text attributes. The one or more query types may include a text interpretation query for which an individual record comprises one or more response-contributor strings (strings which may be used in combination to determine or produce the final query response). A result for the text interpretation query with respect to an individual record may be based at least in part on an extracted-property class associated with the individual record in at least some embodiments. The instructions when executed across the one or more processors may train a composite machine learning model, comprising a pair of sub-models, to extract a respective result for the text interpretation query from a plurality of records. The output generated by the first sub-model corresponding to an input record may comprise a predicted extracted-property class (either a quantitative extracted-property class such as volume, weight, count, etc., or a non-quantitative extracted-property class such as material, shape, etc., depending on whether the query type is quantitative or not) corresponding to the input record in at least one embodiments. The first sub-model may comprise a character-level embedding layer in at least some implementations. Input of the second sub-model may comprises extracted-property class predictions generated as output by the first sub-model. The second sub-model may predict respective positions of one or more response-contributor strings within the input record, which can be used to generate the result of the text interpretation query. A trained version of the composite model may be stored. Note that at least in some embodiments, the response to a text interpretation query may involve the use not just of the response-contributor strings identified by the model, but also one or more other parameters such as a rule which indicates the specific units (e.g., kilograms versus pounds) in which the query response is to be formulated.

In some embodiments, the record text analysis techniques described above may be implemented at one or a network-accessible service (e.g., an analytics service, a machine learning service, or an artificial intelligence service) of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service at which composite models of the kind discussed above may be developed and deployed. A VCS may also be referred to as an elastic compute service, virtual machines service, computing cloud service, compute engine, and/or cloud compute in various implementations.

Example System Environment

FIG. 1 illustrates an example system environment in which techniques for record content interpretation and extraction may be implemented at an analytics service, according to at least some embodiments. As shown, system 100 comprises a plurality of resources and artifacts of analytics service 102, including a content interpretation and extraction subsystem (CIES 120), machine learning model training and execution managers 142 and interaction interface managers 155. Each of these components of the analytics service 102 may comprise software, firmware and or hardware of one or more computing devices in various embodiments. In some embodiments, the analytics service 102 may also include various other subsystems which can be used to process other types of tasks with respect to entity records, such as duplicate detection, clustering of similar records, and the like, which are not shown in FIG. 1. Analytics service 102 may also be referred to as a machine learning service or an artificial intelligence service in some embodiments.

Analytics service 102 may implement one or more programmatic interfaces 177, such as web-based consoles, a set of application programming interfaces (APIs), command line tools, graphical user interfaces and the like in the depicted embodiment. The interfaces 177 may be used by a variety of clients or users to submit requests pertaining to record analysis from client devices 180 such as desktops, laptops, mobile computing devices such as tablets or phones, and the like, and receive corresponding responses. In some embodiments, a client of the analytics service 102 may submit a programmatic request indicating that a machine learning model be trained to provide responses to one or more query types with respect to a collection of entity records accessible from one or more data sources 140. The entity records in the data sources 140 may each, for example, comprise at least some text attributes describing real-world objects or items, such as groups of items (or individual items) representing respective entries within a catalog of a store. Clients may also use interface 177 to submit instances of the queries, directed towards one or more entity records, and receive responses to the queries obtained at the analytics service using trained composite models for query processing. In at least some embodiment, one or more interaction interface managers 155 may receive and parse the contents of messages sent by clients via interfaces 177, and then transmit corresponding internal requests to other components of the analytics service as needed to fulfil client requests. In some embodiments, programmatic interfaces 177 may be used to direct queries to a search engine 167, which may employ the trained machine learning models of the CIES to respond to the queries—e.g., in one embodiment in which price-per-unit (PPU) is a metric of interest with respect to entity records, the search engine may sort search results in order of increasing PPU so that a consumer is able to identify less expensive (in PPU terms) products quickly.

The CIES 120 may store several types of metadata pertaining to the interpretation of data sets in the depicted embodiment. A set of supported query types 124 may be included in the metadata in some embodiments, such as PPU queries, queries pertaining to materials used for various products/entities represented in the records, and so on. At least some query types may potentially require multiple relevant substrings from unstructured text attributes of entity records in the depicted embodiment; the number of substrings may vary from one entity record to another for the same query type, and from one query type to another. In effect, to provide a response to a query, at least some text in the records' attributes may have to be logically divided into relevant substrings (which collectively can help to provide the response) and irrelevant substrings (which are not as useful with respect to providing the response). The relevant substrings may also be referred to as response-contributor strings in various embodiments.

For a given query type such as PPU, a preliminary classification decision may have to be made in at least some embodiments, and the result of the classification decision may influence the selection of the relevant substrings. This classification decision may be query-type-dependent in at least some embodiments—for example, for PPU queries, a decision may have to made regarding whether the unit measurement category (UMC) is weight, volume, count, area, or something else. Metadata indicating the query-type-dependent extracted-content categories 128 (such as UMCs for PPU queries) for various query types may also be stored at the CIES 120 in the depicted embodiment. In at least some embodiments, query types to be supported, and/or corresponding extracted-content categories such as UMCs may be indicated via programmatic interfaces 177 by clients of the analytics service.

In at least some embodiments, several different types of labeled data sets 132 may be used to train models (e.g., at machine learning training and execution managers 142) which can generate responses to the supported query types 124. In one embodiment in which a composite model is trained for responding to the queries, a first labeled data set may be used to train a classifier sub-model of a composite model in accordance with one or more classification algorithms 134 (such as neural network-bases classification algorithms, decision tree based classification algorithms and so on). In the first labeled data set, a given label for a given input record and a given query type may indicate an extracted-content category 128 (e.g., a UMC such as weight or volume) for that record. Such labels may be obtained from a set of annotators such as subject matter experts in the depicted embodiment. In a second labeled data set which may employed to train an extractor sub-model of the composite model, a label for a given record and a given extracted-content category 128 may indicate the positions of one or more result-contributor strings within a text attribute of the record. Any of a variety of content extraction algorithms 136 may be used for the second sub-model in different embodiments, including for example neural network-based algorithms.

In at least some embodiments, at least some labels indicating the result-contributor string positions for the second labeled data sets may be generated automatically. For example, in the PPU scenario, while total unit quantities for various records may be provided by a set of annotators or auditors, the positions of text attribute substrings which can be used to compute the total unit quantities may be detected by automated labeling algorithms 130. Consider a scenario in which a model for responding to PPU queries is to be trained, the UMC for a given training record is "weight", and the total unit quantity (provided by an annotator) for a given record as 240. In this example scenario, the automated labeling algorithm may attempt to identify some set of substrings in the text of the record, such that, when converted into numbers, the product of the numbers derived from the substrings is 240. Thus, if the substrings "30" and "8" appear in a text attribute, they may be identified as contributor strings (since 30×8=240), or if the substrings "15", "4" and "4" appear in the text attribute, they may be identified as substrings. Note that the contributor strings need not necessarily comprise numerals in such quantitative query scenarios: for example the substrings "15", "eight" and "two" may be identified as contributor strings for the 240 total unit quantity case, and their start and end positions may be indicated in the automatically generated label. In some embodiments, the automated labeling algorithms may be generated internally at the CIES 120, e.g., using natural language processing techniques. In other embodiments, at least some automated labeling algorithms 130 may be provided via programmatic interfaces 177 by clients of the analytics service 102.

In some embodiments in which neural networks are used for the sub-models, one or both of the sub-models may include character-level embedding layers or character-level encoders. In various embodiments, the classifier sub-model may include one or more convolutional neural networks (CNNs), an attention layer (used for learning respective levels of importance for different text attributes), one or more fully connected layers, one or more softmax layers. In some embodiments, the extractor sub-model may also include one or more CNNs, e.g., at least one CNN dedicated to identifying starting positions or start indexes of the result-contributor substrings, and at least one CNN dedicated to identifying ending positions or end indexes of the result-contributor substrings. Input to the classifier sub-model may include an entity record and an indication of the query type in some embodiments, and the output produced may indicate the predicted extracted-content category. Input to the extractor sub-model may include the entity record, and an indication of the corresponding extracted-content category predicted by the classifier, while the output produced may indicate the predicted positions of contributor strings which can be used to generate the response to the query. In at least one embodiment, the extractor sub-model may not only extract the relevant substrings from text attributes, but also combine the contents of the extracted substrings to produce the final response to the query (e.g., the PPU). In other embodiments, the final result to be provided to the query requester may be generated at a separate component.

Trained versions of the composite model may be included in a trained models repository 137 in various embodiment. In some embodiments, the classifier sub-model may be trained first, without incorporating the extractor sub-model in the training procedure. Then, after a classifier of desired quality level has been obtained, the trained version of the classifier sub-model may be used in the training of the extractor model. Different composite models may be trained to respond to respective query types in some embodiments—e.g., one composite model may be trained for PPU queries, another for constituent materials queries, and so on.

After the composite model for a given supported query type 124 has been trained, it may be used to respond to various queries of that type, e.g., submitted via programmatic interfaces 177. Results of the queries, obtained using the trained model at machine learning training and execution managers 142, may be transmitted to one or more destinations specified in the query requests in some embodiments, such as record collection/catalog managers 168 and/or search engines 167, which can use the results to organize or improve their catalogs and search results. In at least one embodiment, candidate catalog entry submissions 182 may be received at the analytics service and processed in real time using the a trained version of a composite model. For example, some fields within the submitted information may be automatically filled in after analyzing the text attributes of the submitted entry, or mistakes in the submission may be quickly detected and reported to the submitter or other entities.

Examples of PPU Determination Using Multiple Contributor Strings

FIG. 2 illustrates example text attributes of records for which price-per-unit computations may require identification of multiple substrings, according to at least some embodiments. Table 200 shows respective text attributes (column 210) for four example records 220A-220D which may be included in a catalog of beverages of a store. The unit measurement category (UMC) corresponding to each of the records is shown in column 212. The total unit quantity (UQ) corresponding to each of the records is shown in column 214, along with an indication of the contributing numeric quantities of the UQ. Once the total unit quantity has been determined, the price per unit (PPU) can be easily computed by dividing the price associated with the record by the total UQ, as shown in column 216.

Record 220A's text attribute contains information about ground coffee described in terms of cups, and contains the text "36 ct—12. 4 oz box, pack of 2". The UMC for record 212 is count, i.e., the total number of units (packages in this case) of coffee is to be used to calculate the PPU. The total UQ for this example is 72, which can be automatically computed if a machine learning model is successfully able to identify the substrings "36" and "2" as relevant to the PPU. Note that record 220A's text attribute also contains a numeric string which could indicate weights or volume ("12.4"). The detection of the relevant substrings "36" and "2" is thus (a) dependent on the UMC identified for record 220A and (b) more complicated than simply identifying all the numeric strings. Any single substring would be insufficient to compute the UQ and hence the PPU for record 220A. The UMC for record 220C (which pertains to tea bags) is count, and the strings "16" and "6" have to be identified as relevant in order to compute the total UQ 96 which is in turn used to determine the PPU.

For records 220B (which pertains to coffee beans) and 220D (which pertains to loose tea), the UMC is weight, not count. In the case of record 220B, three substrings ("10", "500" and "2") are relevant to the computation of the total UQ expressed in kilograms, while in the case of record 220D, two substrings "250" and "8" are relevant.

As indicated by the examples shown in FIG. 2, in order to be able to successfully respond to queries regarding PPU, a machine learning model may have to learn to distinguish among record descriptions (e.g., for loose tea or for coffee beans) for which weight is more likely to be the preferred UMC versus record descriptions (e.g., for bags or cups of drinks) for which count is more likely to be the preferred UMC, what types of numeric information is to be ignored in the records (e.g., weight measures for records for which the UMC is count), the significance of strings such as "ct" (count), "pack", "gram", etc. and so on. Furthermore, even for a given UMC, the number of relevant substrings may vary from one records to another (e.g., three relevant substrings for record 220B versus two relevant substrings for record 220D, both of which have weight as the UMC). In at least some embodiments, a composite neural-network based model similar to that shown in FIG. 3 may be used.

Example Composite Model

Figure 3:
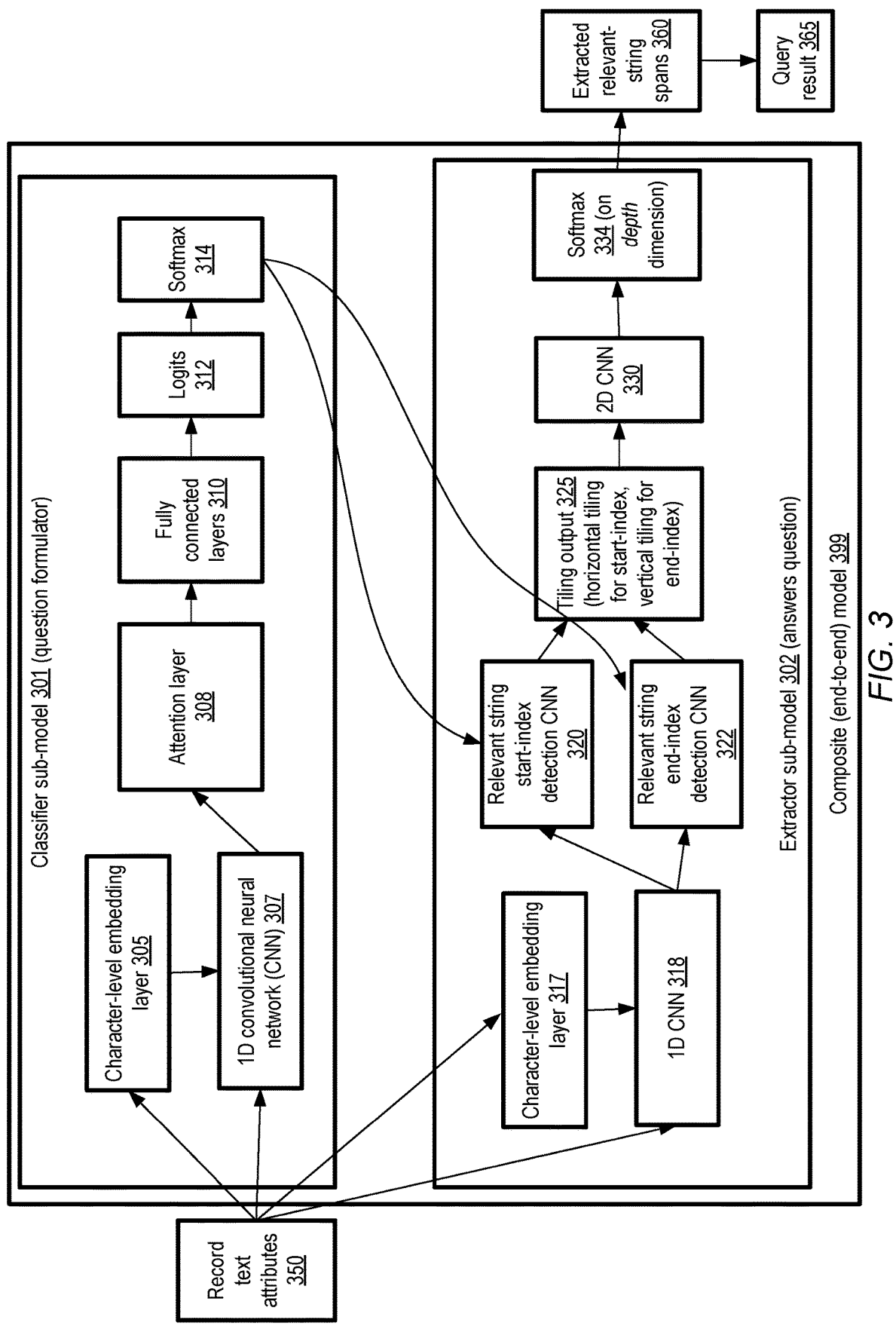
FIG. 3 illustrates a high-level architecture of a composite model which may be used for record content interpretation and extraction, according to at least some embodiments.

FIG. 3 illustrates a high-level architecture of a composite model which may be used for record content interpretation and extraction, according to at least some embodiments. As shown, composite or end-to-end model 399 for a particular query type (e.g., PPU queries) may comprise two sub-models: a classifier sub-model 301 and an extractor sub-model 302. The classifier sub-model 301 may be considered the equivalent of a question formulator, responsible for determining the particular kind of specific questions which are to be answered using text analysis for a given higher level query, while the extractor sub-model may extract the relevant text portions to prepare the answers to the specific questions.

During training, one or more text attributes 350 of each record may be provided as input (e.g., a sequence of characters) to both sub-models. Character-level embedding layer 305 may be used in sub-model 301, and character-level embedding layer 317 may be used in sub-model 302. As such, different embeddings may be used for a given character in the two sub-models, which is appropriate as the two sub-models learn different aspects of the text attribute contents. In some embodiments, embeddings for a relative small supported character collection (e.g., 100 characters) may be used. Note that at least in some embodiments, the text input to the model may be expressed in any of several languages; as long as the most commonly-used characters of each language's records are included in the supported character collection, the composite model may be able to interpret the text for the query type being considered. The composite model 399 may thus be considered language-agnostic or language-independent in some embodiments. Embeddings at higher levels (e.g., word or token level, or attribute level) may not be required in at least some embodiments.

In sub-model 301, the character-level embedding layer 305 may map individual characters into a multi-dimensional vector (e.g., a 4-dimensional vector in one implementation). The embedding vectors from layer 305 may be fed into a 1-dimensional (1D) CNN 307 in the depicted embodiment. In some implementations, the CNN 307 may for example comprise a first layer with two branches with filter mask sizes of 3 and 5 and three subsequent layers with filter mask size 3 and max pooling. In one implementation, the output sequence of the CNN 307 may be $\frac{1}{8}^{th}$ the size of the input sequence, and the output sequence may have a depth of 150, which is batch normalized and reduced to a 150D vector by summing. Hence, each input attribute may be encoded into a 150D vector. During training, dropout may be applied on the output of the CNN 307, which is provided as input to the attention layer 308.

The attention layer 308 (also referred to as an attention module) may compute an attention vector for all input attributes, in effect assigning relative importance levels to the different text attributes in the depicted embodiment. In some embodiments, each attribute encoding vector provided as input to the attention layer 308 may be affine transformed to obtain attention keys, which are scaled element-wise and summed to find the logits 312 for the softmax weights 314. In the depicted embodiment, the output of the attention layer 308 may be passed through some number of fully connected layers 310 before the logits and softmax weights are obtained.

In the extractor sub-model 302, in some embodiments, one-dimensional CNN 318 may be used to obtain an encoded sequence without any strided pooling. In some embodiments the depth or dimensionality of the resultant sequence produced by the 1D CNN 318 may be shorter than the depth of the sequences generated in the classifier sub-model 301 at the 1D CNN 307. Note that the sequence length may be kept the same as the input character sequence length in the extractor sub-model 302, as the objective is to determine the relevant substrings. In one implementation, for example, the output of id CNN 318 may have a depth of 50, which is batch normalized. During training, dropout may be applied on the output of CNN 318.

The encoded sequence vectors produced by 1D CNN 318 may be concatenated with the softmax outputs from the classifier sub-model 301 in the depicted embodiment, and fed to two CNNs 320 and 322 configured to help identify the start-indexes and end-indexes respectively of relevant substrings in the input text. As such, the output of the classifier sub-model 301 may be used as part of the input to the extractor sub-model 302. Separating the processing pertaining to the start indexes and end indexes using CNNs 320 and 322 may enable specialized learning for start and end index prediction in the depicted embodiment. The output of the CNN 320 may comprise a 1D vector sequence SIVS (for "start-index vector sequence") of length N (where N is the number of characters in the input text) in some embodiments, with an M-dimensional vector at each of the N positions (where M is a hyper-parameter). Similarly, the output of the CNN 322 may comprise a 1D vector sequence EIVS (for "end-index vector sequence") of length N in some embodiments, with an M-dimensional vector at each of the N positions in EIVS.

In some embodiments, SIVS may be tiled horizontally while EIVS is tiled vertically, to produce two tensors of size N×N×M (tiling output 325). The two tensors may be multiplied elementwise to create a span-image of width and height equal to N, and depth equal to M. 2D convolutional filters may be applied to the span-image, and the 2D CNN 330 may produce an image of size N×N and depth C, where C is the number of extraction classes. In softmax layer 334, normalization may be applied on the depth dimension, as opposed to the sequence dimension as is typically done in many neural network models. The extracted relevant-string spans 360 (e.g., determined based on the probabilities generated at the softmax layer 334) may be used to compute values such as total unit quantities, which can in turn be used to provide query results 365 (e.g., the exact price per unit in the PPU use case). Multi-dimensional CNNs such as CNN 330 may be used in the depicted embodiment to predict respective spans of multiple relevant strings, instead of (for example) assigning probabilities separately for start-index positions and end-index positions of each of the strings. The flexible approach illustrated in FIG. 3 may even be used, for example, to extract multiple relevant strings in scenarios in which more than one relevant string starts at the same index position (or in scenarios in which more than one relevant string ends at the same index position, or overlap with one another). This flexible approach contrasts with conventional techniques in which at most a single relevant string is extracted for a given query, thus limiting the kinds of queries for which responses can be generated in the conventional techniques.

One or more hyper-parameter values of the sub-models 301 and 302 (such as the dimensionality of various intermediate vectors/tensors, the number of layers of various CNNs, and so on) may be specified by clients of an analytics service similar to service 102 of FIG. 1 in some embodiments. In at least some embodiments, variants of the architecture shown in FIG. 3 may be used—e.g., in one embodiment, instead of providing probabilities jointly for respective pairs of start and end index positions of relevant substrings, separate probabilities may be provided for start indexes and end indexes.

Figure 4:
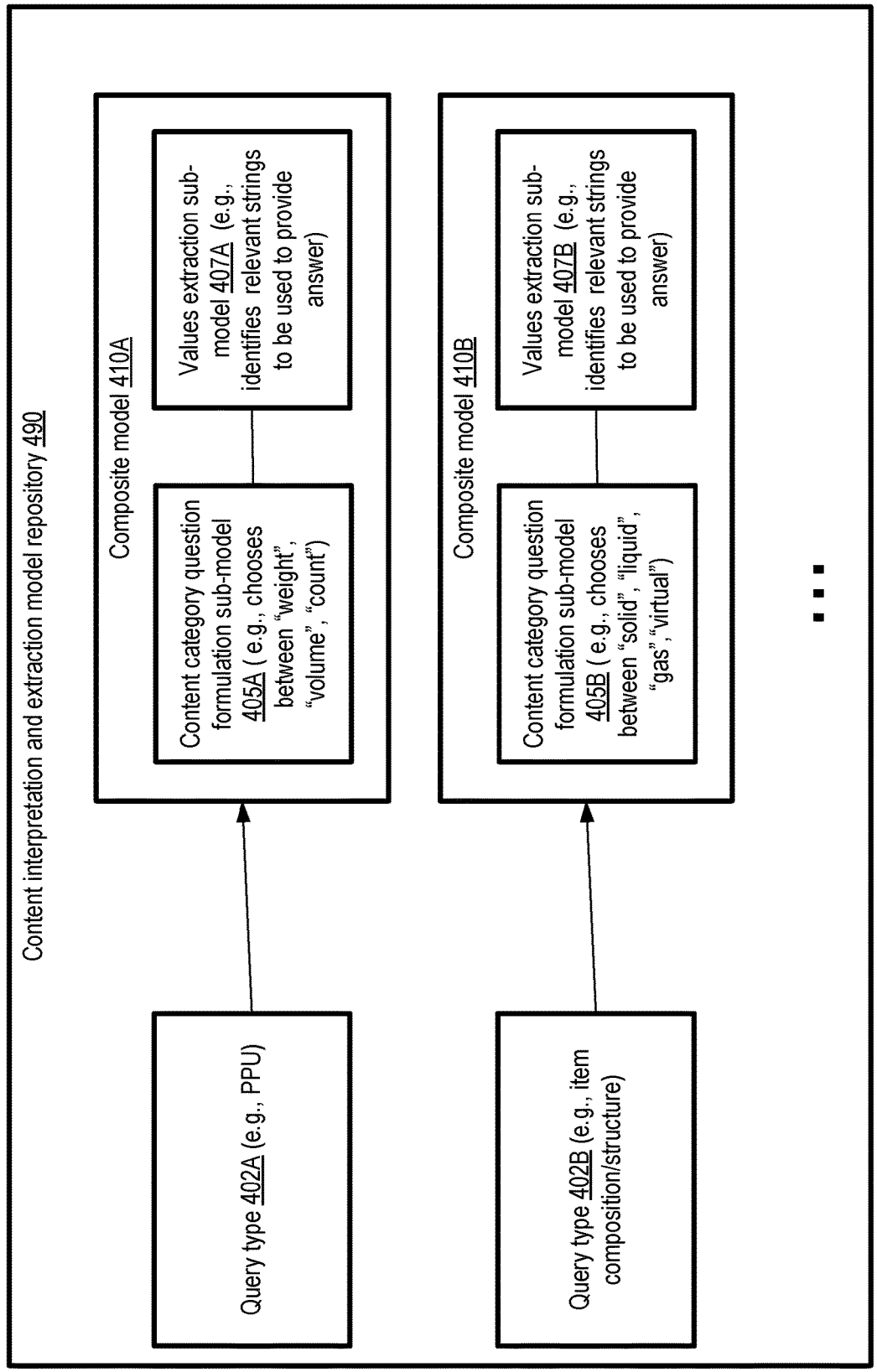
FIG. 4 illustrates a model repository at which respective components models trained and executed for different query types may be stored, according to at least some embodiments.

FIG. 4 illustrates a model repository at which respective components models trained and executed for different query types may be stored, according to at least some embodiments. In the depicted embodiment, a first composite model 410A stored in a content interpretation and extraction model repository 490 is trained to respond to queries of query type 402A (e.g., PPU queries), a second composite model 410B is trained to respond to queries of query type 402B about the composition or structure of items represented in the records, and so on. Note that the queries of several different query types may be directed to the same underlying entity records: for example, for records of a store catalog, PPU queries as well as composition/structure queries may be useful.

Within each composite model 410, shown in FIG. 4, a content category question formulation sub-model 405 (e.g., 405A or 405B) may be used to generate the specific questions (e.g., "what is the total volume?" or "what solid materials make up the item?") whose answers can then be provided by a values extraction sub-model 407 (e.g., 407A or 407B). In some embodiments, classifiers similar to classifier sub-model 301 of FIG. 3 may be used for the question formulation. One or more substrings may be extracted from the text attributes of the records to obtain the query results in various embodiments. In at least one embodiment, non-text attributes such as images, videos or audio attributes may also be used in the question formulation sub-model. For example, an entity record may comprise an image or photograph of the entity, and an encoding/embedding of the image may be generated and analyzed in the composite model to help with the question formulation and/or the extraction of the content required to answer the query. In at least one embodiment, portions of a non-text attribute (e.g., a part of an image or video) may be extracted and used to prepare a response to the query, e.g., in addition to or instead of using text extracts alone.

Example Interfaces

Figure 6:
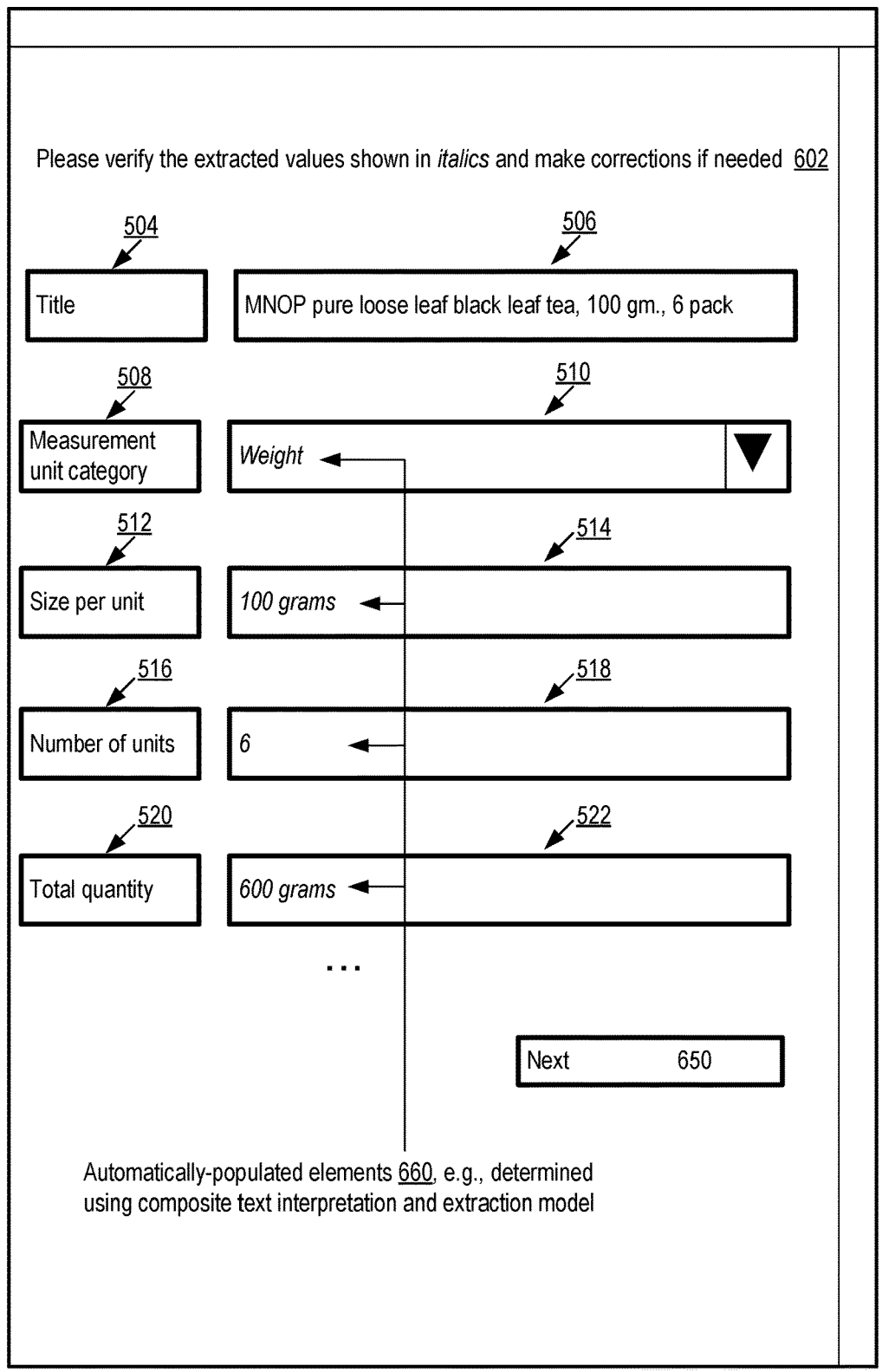

As mentioned earlier, in some embodiments the techniques proposed above may be used to help simplify tasks associated with the submission of new entity records for catalogs. FIG. 5 and FIG. 6 collectively illustrate example graphical user interfaces which may be used to automatically fill out catalog entry submission form elements using a trained composite model for record content interpretation and extraction, according to at least some embodiments. As shown, interface 500 (implemented for example as a web page or a standalone graphical user interface) may allow submitters such as potential sellers of items via a website to provide information about various entities, including text titles, sizes and other packaging-related properties of the entities. An introductory message area 502 may inform the submitter that an entry submission tool will automatically extract relevant values as text is entered into a form element, and use the extracted information to fill out one or more other form elements.

A title 504 for a proposed new catalog record may be entered into form entry element 506 by the submitter in the depicted example. A measurement unit category 508 may be entered manually if desired, e.g., using a drop down menu, in element 510. A size per unit 512 may be entered into element 514, the number of units 516 packaged together in the proposed catalog entry may be entered in element 518, and the total unit quantity 520 may be entered in element 522. In order for the submission of the new catalog entry to be considered, information may have to be filled in in all the elements 506, 510, 514, 518 and 522. In some cases, if the submitter wishes to do so, respective values may be entered for all of the elements. After entering values into some combination of elements, the submitter may use the "Next" interface element 550 to proceed to the next phase of the submission procedure.

In the depicted embodiment, a tool comprising a composite model similar to those discussed earlier may be analyze text as it is entered into various fields, such as the title entry element 506. The tool may extract relevant text from the information typed in, and use it to populate other elements of the submission. In the example depicted in FIG. 5 and FIG. 6, the submitter enters the text "MNOP pure loose leaf black tea, 100 gm., 6 pack" into element 406.

In real time, the tool associated with interface 500 may examine the title information entered, recognize that it contains data which can be used to populate various other elements of the submission, extract the appropriate substrings, and populate those other fields accordingly in the depicted embodiment. FIG. 6 shows example results of the analysis performed using the model. View 600 shows a message 602 requesting the submitter to verify the automatically-generated data n elements 510, 514 518 and 516. The tool associated with the interface 500 may determine (e.g., using a trained classifier sub-model similar to sub-model 301 of FIG. 3) that the measurement unit category should be "Weight" for the proposed record. The strings "100 gm." and "6" may be extracted by an extractor sub-model similar to sub-model 302 of FIG. 3 to fill out the size per unit (100 grams) and the number of units (6), and the total quantity (600 grams) may be computed from the product of the size per unit and the number of units. If desired, the submitter may modify some or all of the auto-populated elements 660 in the depicted embodiment. The "Next" interface element 650 may be used to proceed to the next phase of the submission procedure after the auto-populated data has been verified or corrected. The use of the composite model may enhance the user experience of the submitter by reducing the number of elements for which data has to be entered manually in the depicted embodiment.

Furthermore, in at least some embodiments, the composite model may be used to check the internal consistency of the information provided by a submitter of a new record. If the submitter mistakenly enters "8" into the "number of units" element 518 manually, for example (without making any other corresponding changes, e.g., to the title), the mistake/error may be detected because "8" does not match the value "6" extracted by the model. A notification of the inconsistency may be provided in real time to the submitter in some embodiments and/or a proposed correction may be indicated to the submitter. In addition, in various embodiments, the composite model may be used to check existing records of a catalog for internal consistency, and to make corrections (and/or backfill missing values in various elements of the records) as needed.

Example Programmatic Interactions

Figure 7:
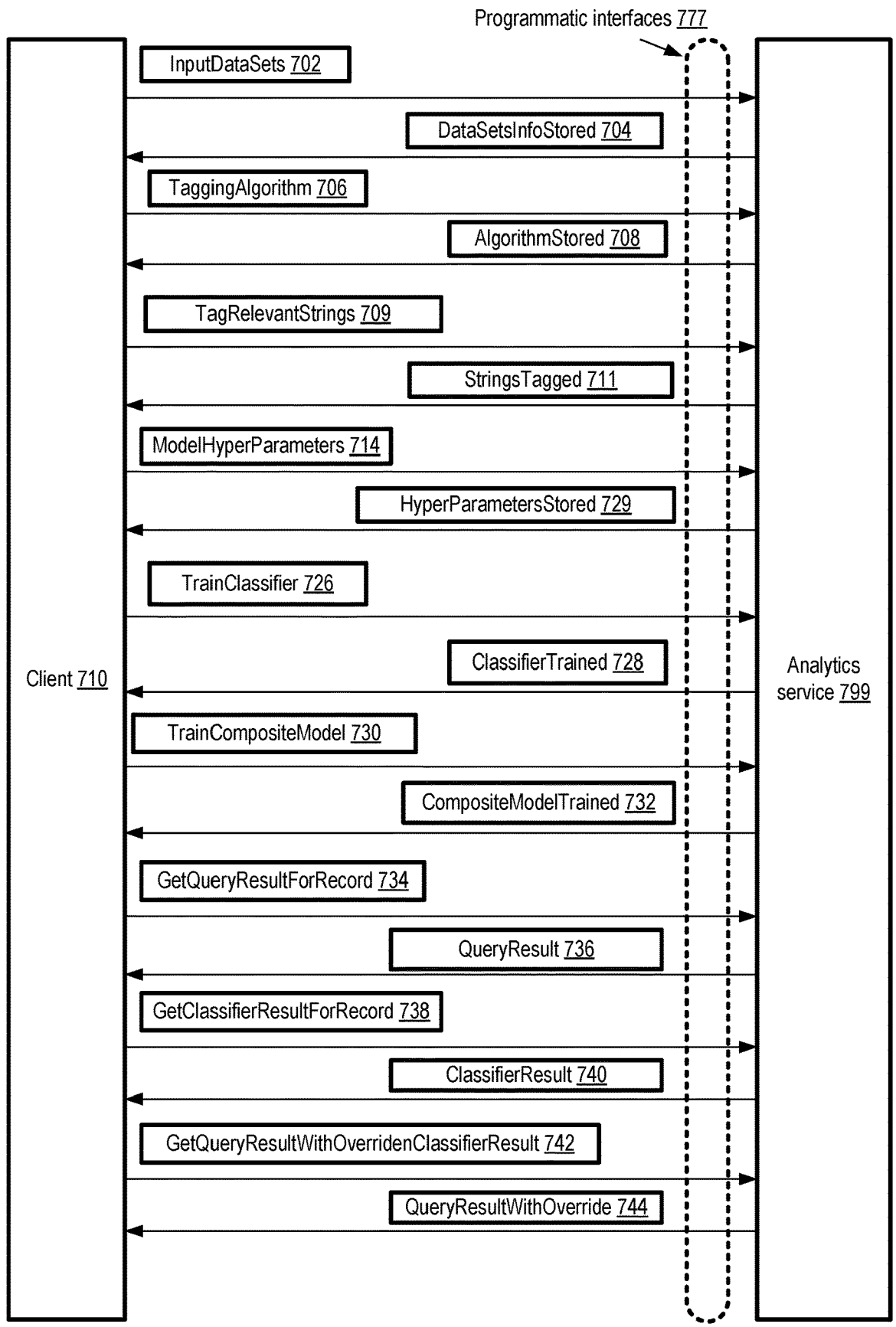
FIG. 7 illustrates example programmatic interactions pertaining to record content interpretation and extraction, according to at least some embodiments.

FIG. 7 illustrates example programmatic interactions pertaining to record content interpretation and extraction, according to at least some embodiments. In the depicted embodiment, an analytics service 799 similar in functionality and features to analytics service 102 of FIG. 1, may implement programmatic interfaces 777 such as a web-based console, command line tools, graphical user interfaces, APIs and the like which can be used by clients 710 to submit messages/requests and receive corresponding responses.

A client 710 may, for example, submit one or more InputDataSets messages 702 indicating storage locations at which unlabeled or labeled records can be obtained by the analytics service 799 in the depicted embodiment. In response, the analytics service 799 may store the provided information and send a DataSetsInfoStored response message 704 back to the client. In some implementations, the client may send the records themselves in the message 702 instead of providing an indication of the storage locations/resources used for the records. In some embodiments, labels (e.g., indicating extracted-content categories such as unit measurement categories in the case of PPUs, and/or relevant substring start-index and end-index locations) may be stored along with the records.

In at least one embodiments, information (such as total unit quantities) which can be used to generate the labels may be included with the records, and the analytics service 799 may generate the labels from such values, e.g., using text-tagging algorithms. In one embodiment, a client 710 may provide the tagging algorithm via programmatic interfaces 777, e.g., in a TaggingAlgorithm message 706. The analytics service may store a representation of the tagging algorithm, and send an AlgorithmStored message 708 to the client in some embodiments.

In some embodiments, a client 710 may submit a TagRelevantStrings request 709, which may cause the analytics service 799 to apply a text tagging algorithm of the kind whose pseudocode is shown above to various entity records, thereby obtaining the labels needed for the training data set of the extractor sub-model. After the relevant strings have been identified for the data set, a StringsTagged response message 711 may be sent to the client.

In various embodiments, a client may indicate values for one or more hyper-parameters of the composite model via a ModelHyperParameters message 714. The client may use such a message, for example, to specify preferences for the dimensionalities of the vectors/tensors to be generated, the numbers and sizes of various CNNs, the loss functions to be used in the model, and so on. The provided hyperparameter preferences may be stored, and the analytics service may send a HyperParametersStored response 729 back to the client in the depicted embodiment.

A client may submit a TrainClassifier request 726 via programmatic interfaces 777 in some embodiments. In response, the classifier sub-model may be trained at the analytics service, e.g., using a labeled data set indicate earlier by the client for a particular query type, and a ClassifierTrained message 728 may be sent to the client when the training is complete.

In various embodiments, a client may send a TrainCompositeModel request 730 to the analytics service 799. In scenarios in which a trained version of the classifier sub-model has already been obtained (e.g., subsequent to a TrainClassifier request 726), the trained version of the classifier may be used to train the extractor sub-model. If a classifier sub-model has not been trained yet, in some implementations it may be trained first in response to the TrainCompositeModel request 730 and then the extractor sub-model may be trained. In one implementation, the classifier and extractor sub-models may be trained jointly in response to a TrainCompositeModel request 730. After the composite model has been trained, in at least some embodiments a CompositeModelTrained message 732 may be sent to a client.

Using a trained version of the composite model, a response to a query (such as a PPU query) may be generated in various embodiments with respect to a given input record. A GetQueryResultForRecord message 734 may be submitted by a client 710, and the appropriate trained composite model may be executed at the analytics service 799 to generate the response. The result of the query (such as a PPU value) for the input record may be provided via a QueryResult message 736 in the depicted embodiment.

In at least one embodiment, a client may be provided a way of examining, and if desired, overriding the classifier sub-model's result for a given input record. A GetClassifierResultForRecord request 738 may be submitted to obtain just the classifier sub-model's output (instead of the final query result), and the corresponding classification result may be provided to the client via a ClassifierResult message 740. Then, if the client 710 wishes to override the classifier, a GetQueryResultWithOverriddenClassifierResult request 742 may be submitted, indicating the overridden class that should be provided along with the input record to the extractor sub-model. The final result of the query, generated with the help of the extractor sub-model and the overridden class, may be supplied to the client 710 in a QueryResultWithOverride message 744 in the depicted embodiment. In at least some embodiments, several of the kinds of programmatic requests/messages shown in FIG. 7 may be submitted for each query type of interest—for example, different input data sets may be indicated via messages 702 for each query type of interest, different composite models may be trained for each query type in response to respective TrainCompositeModel messages 730, and so on. In various embodiments, programmatic interactions other than those shown in FIG. 7 may be supported by an analytics service.

Example Provider Network Environment

Figure 8:
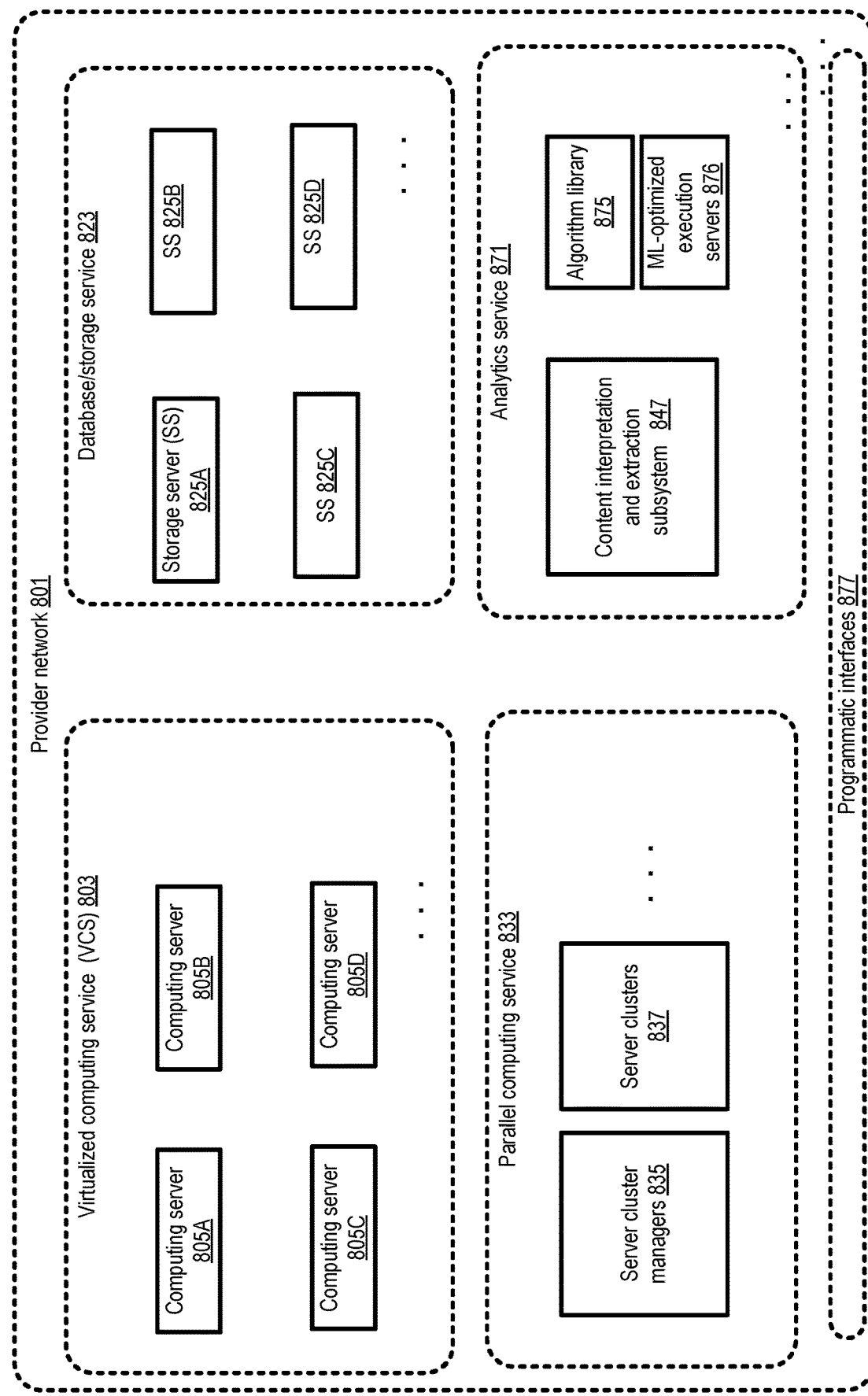
FIG. 8 illustrates an example provider network environment in which an analytics service may be implemented, according to at least some embodiments.

In some embodiments, as mentioned earlier, an analytics service at which content analysis techniques similar to those described above may be implemented at a provider network. FIG. 8 illustrates an example provider network environment in which an analytics service may be implemented, according to at least some embodiments. In the depicted embodiment, provider network 801 may comprise resources used to implement a plurality of services, including for example a virtualized computing service (VCS) 803, a database/storage service 823, and a parallel computing service 833 as well as an analytics service 871 similar in features and capabilities to analytics service 102 of FIG. 1. The analytics service 871 in turn may comprise a content interpretation and extraction subsystem 847 at which queries which potentially require multiple response strings to be identified may be processed using techniques introduced above. Machine learning models of an algorithm library 875, implemented at a set of machine-learning-optimized execution servers 876, may be employed for various tasks at subsystem 847. The parallel computing service 833 may comprise various server clusters 837, each comprising a plurality of servers, on which parallelizable workloads may be distributed by a set of server cluster managers 835 in the depicted embodiment. Some of the algorithms implemented at the analytics service may be parallelizable, and may utilize the server clusters 837 in at least some embodiments.

Components of a given service may utilize components of other services in the depicted embodiment—e.g., for some analytics service tasks, virtual machines implemented at computing servers such as 805A-805D of the virtualized computing service 803 may be used, server clusters 837 and/or cluster managers 835 may be utilized for parallelizable computations of the analytics service, input data and/or output produced at the analytics service may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment.

In some embodiments, at least some aspects of the content analysis techniques described herein may be implemented without acquiring resources of network-accessible services such as those shown in FIG. 8. For example, a standalone tool implemented at one or more computing devices which are not part of a network-accessible service may be used in one embodiment.

Methods for Content Interpretation and Extraction

Figure 9:
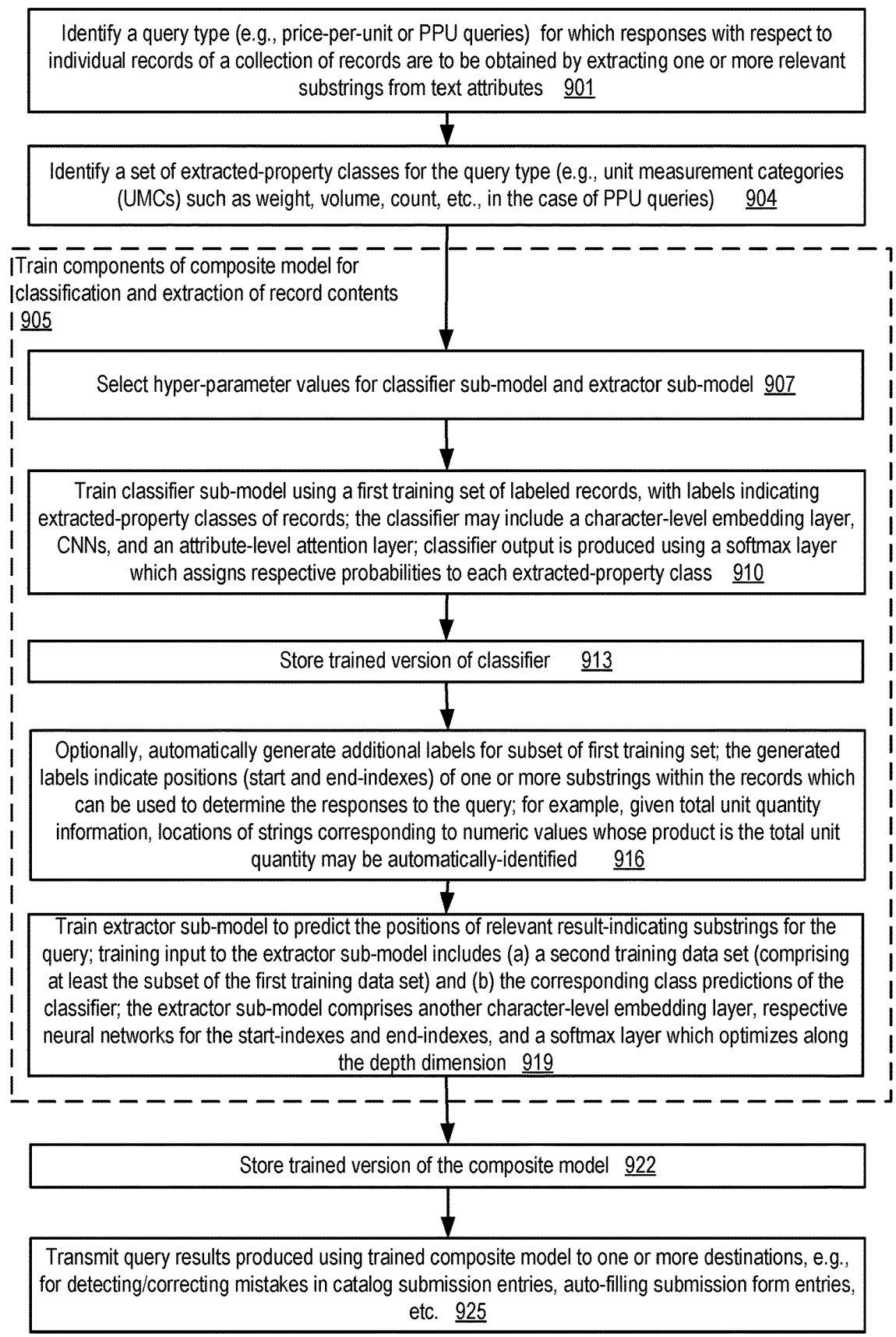
FIG. 9 is a flow diagram illustrating aspects of operations that may be performed to respond to queries of a given query type using a composite machine learning model, and an example of such a data set, according to at least some embodiments.

FIG. 9 is a flow diagram illustrating aspects of operations that may be performed to respond to queries of a given query type using a composite machine learning model, and an example of such a data set, according to at least some embodiments. As shown in element 901, a query type (such as price-per-unit (PPU) queries, other quantitative queries and/or non-quantitative queries) for which responses with respect to individual records of a collection of records are to be obtained by extracting one or more relevant substrings from text attributes of the individual records may be identified or determined, e.g., at an analytics service similar in functionality to analytics service 102 of FIG. 1. For quantitative queries, the relevant substrings may be referred to as quantity-indicator strings. In addition, a set of extracted-property classes associated with the query type may also be identified or determined in various embodiments (element 904). For PPU queries, for example, the extracted-property classes may include weight, volume, count and the like, which may collectively be referred to as unit measurement categories (UMCs). The extracted-property classes may in effect represent different kinds of information, relevant to answering the query being considered, which may be derived from the raw content of the records by extracting relevant substrings. In some embodiments, the query types and/or the associated extracted-property classes may be indicated to an analytics service by a client via one or more programmatic interfaces.

A multi-step procedure indicated in element 905 may be used to train components of a composite model for classification and extraction of record contents to respond to instances of the query type in the depicted embodiment. Hyper-parameters values may be selected for a classifier sub-model and an extractor sub-model of the composite model (element 907). A first training data set comprising a plurality of records may be obtained for the classifier sub-model. In the case of PPU queries for catalog records of a store, for example, the records may comprise packaging information indicating how a given item is bundled or aggregated for selling/ordering by potential customers, and the labels associated with the individual packaging records may indicate the UMCs for the individual records. More generally, the labels for the records of the first training data set may indicate the extracted-property classes of the records.

The classifier sub-model of the composite model may be trained using the first training data set in the depicted embodiment (element 910). In some embodiments, the classifier sub-model may comprise a character-level embedding layer, one or more CNN layers, and an attribute-level attention layer which assigns respective levels of importance to individual attributes of the input records. The classifier may also include a softmax layer in some embodiments, which assigns, for a given input record, respective probabilities to each of the extracted-property classes to which the input record could belong. In other embodiments, other types of classification algorithms which may not necessarily include neural network layers may be used for the classifier sub-model. A trained version of the classifier sub-model may be stored in various embodiments (element 913).

A subset of the first training data set, with additional labels, may be identified as a second training data set which can be employed for the extractor sub-model in at least some embodiments. Optionally, in some embodiments, the additional labels may be generated automatically (element 916). The generated labels may indicate the positions of relevant substrings within text attributes (e.g., start-indexes and/or end-indexes, when considering a text attribute as an array of characters) which can be used to determine the response to a query of the query type in various embodiments. For example, if a text attribute has 100 characters with respective indices 0-99, an automatically (or manually) generated label may indicate that a first substring starting at index 40 and ending at index 45, a second substring starting at index 56 and ending at index 60, and a third substring starting at index 69 and ending at index 76 may all be relevant to generating the query response. In the PPU case, given a total unit quantity for a packaging record (obtained for example from a manual auditors or labeler) and candidate locations for numeric quantities, the correct candidate locations of strings corresponding to numeric values whose product is the total unit quantity may be identified automatically, e.g., using a part-of-text tagging algorithm, and used as the additional label in some embodiments.

Pseudo-code for an example tagging algorithm (GetRelevantTextSpans) which assumes that at most three substrings may be needed from a given text attribute of a record to extract a total unit quantity for a PPU query type, and assumes that the possible MCUs are (weight, volume, count) is provided below. In the example pseudo-code, as indicated in the "for k in (3, 2, 1)" loop, the search for relevant substrings is begun with a search for three separate substrings, then (if three relevant substrings aren't found) two substrings are searched, and then (if two relevant substrings aren't found) an attempt to find a single substring is made. This approach (starting searching for larger rather than smaller numbers of substrings) may favors learning of more complex packaging arrangements in the composite model.

--Start example pseudo-code for text tagging algorithm------------------

```
Input:
    candidate_span_list; // list of tuples of start and end
        indices of candidate quantities within a record
    TUQ; // total unit quantity, provided by annotators/auditors
    MCU_type: // MCU label provided by annotators/auditors
Result: qualified_span_list; // list of tuples of correct start
    and end indices
GetRelevantTextSpans:
if (TUQ==1) and (MCU_type==count) then return empty
    list;
endif
for (k in 3, 2, 1) do
    foreach combination in N-Choose-K (candidate_span_
        list, k) do
        if (product(all quantities of combination)==TUQ) then
            return combination;
        endif
        if (only one weight or volume quantity is in combina-
            tion) and
            (MCU_type !=count) then
            return combination;
        endif
    endforeach
endfor
return empty list;
```

--End pseudo-code-----------------------------------------------

The extractor sub-model of the composite mode may be trained using the second training data set in various embodiments (element 919) to predict the positions or locations of relevant query-result-indicating substrings within text attributes of input records. The output class predictions of the trained version of the classifier sub-model may also be included in the input of the extractor sub-model in at least some embodiments. In some embodiments, the extractor sub-model may comprise another character-level embedding layer, respective neural network layers (e.g., CNNs) for start-indexes and end-indexes of the relevant substrings, and a softmax layer for the final output. Because this softmax layer has to provide probabilities for potentially multiple combinations of start-indexes and end-indexes, it may optimize along the depth dimension (where the depth corresponds to the number of combinations of start and end locations) rather than along the sequence dimension (as is the case when softmax is used to analyze text and only a single relevant substring is to be found).

A trained version of the composite model may be stored, e.g., at a repository of an analytics service in the depicted embodiment (element 922). Note that in embodiments in which character-level embedding is used, the text embeddings (and hence the composite model) may be language agnostic, in the sense that the text attributes of the input records may be expressed in any of several supported languages (or even combinations of languages) as long as the characters used belong to a set of characters for which embeddings are generated in the model.

When queries of the query type are received, query results obtained using the trained version of the composite model may be transmitted via programmatic interfaces to one or more destinations (element 925). The destinations may, for example, include programs used for detecting/correcting mistakes or inconsistencies in catalog submission entries, automatically filling out submission entries as discussed earlier, and so on. In some embodiments, an analytics service or tool which comprises the composite model may allow clients to override the class predictions generated by the classifier sub-model if desired. Thus, in the PPU scenario, for example, after a particular query directed to the trained version of the composite machine learning model is obtained, a predicted unit measurement category (UMC) obtained for the record indicated in the query by the classifier may be presented to the client. If the client wishes to override the predicted UMC, the client may provide a replacement UMC, which may be provided as input to the extractor sub-model instead of the predicted UMC, thus enabling the client to correct class-prediction mistakes made by the classifier. The corrected or replacement version of the UMC (or more generally, the corrected extracted-property class) may be use at the extractor sub-model to generate the predicted positions of the relevant substrings, from which the response to the query may be obtained.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Use Cases

The techniques described above, of training a composite model to analyze records and extract multiple text substrings relevant to answering queries, may be useful in a variety of scenarios. For example, such techniques may be used at large-scale store organizations to help organize and standardize records in catalogs. Such a model may also improve the user experience of customers and vendors of store web sites. For example, when a vendor wishes to add a new item to a catalog, the model may be able to near-instantaneously detect whether the information entered is consistent, to fill out various elements of a record submission form, and so on. End-user customers of such web sites may get better search results (e.g., search results sorted in order of decreasing or increasing price-per-unit, if such sorting is desired).

Illustrative Computer System

Figure 10:
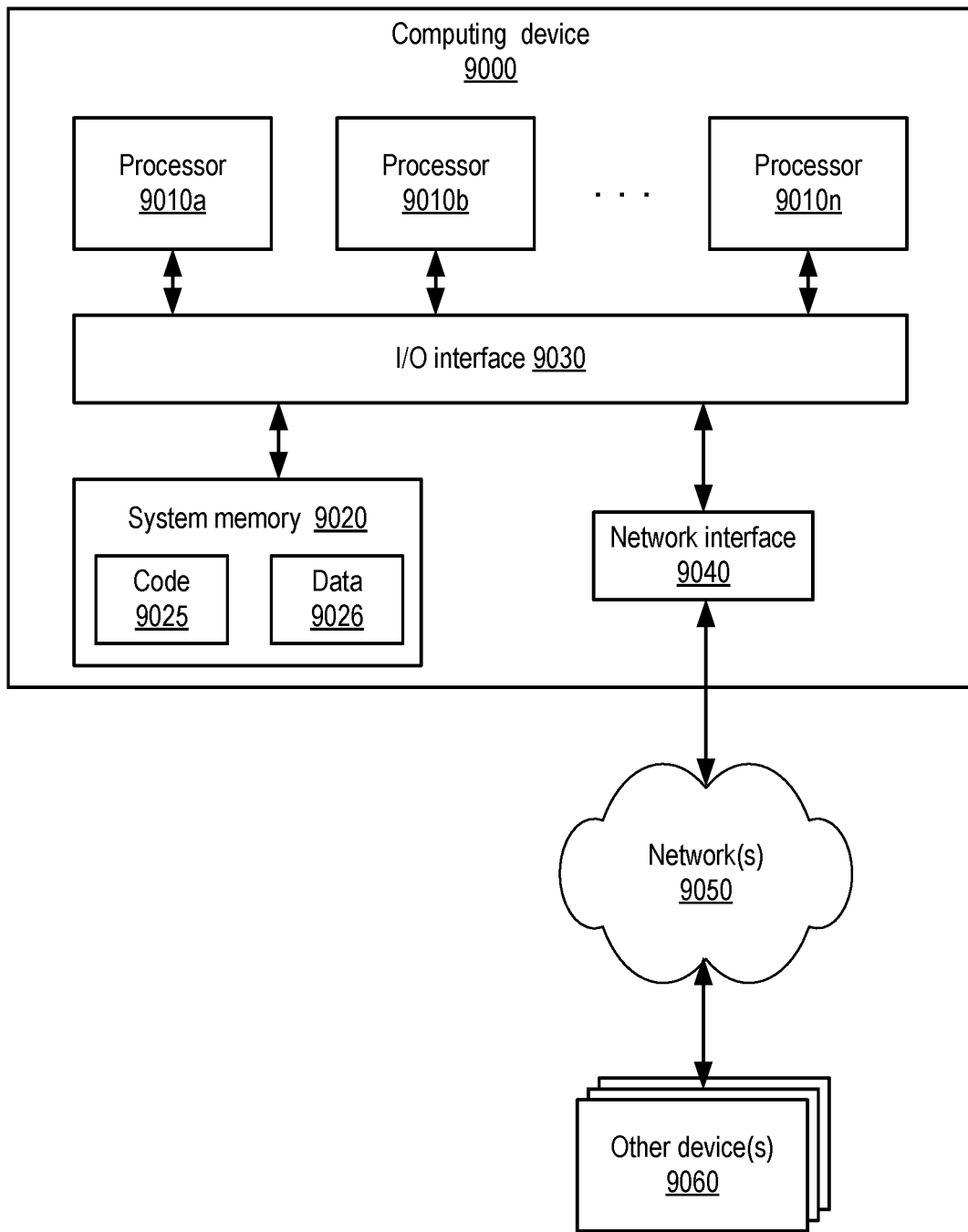
FIG. 10 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices;
wherein the one or more computing devices include instructions that upon execution on or across the one or more computing devices cause the one or more computing devices to:
identify one or more query types for which responses are to be generated with respect to respective packaging records of a collection of packaging records, wherein individual ones of the packaging records (a) represent a respective packaging arrangement of an item and (b) include one or more text attributes, and wherein the one or more query types includes a price-per-unit query type;
determine a set of unit measurement categories for items whose packaging arrangements are represented in the collection, wherein the set of unit measurement categories include weight, volume and count;
obtain a first labeled data set comprising a first plurality of packaging records, wherein a label of an first packaging record of the first labeled data set indicates a particular unit measurement category of the set of unit measurement categories used to determine a price-per-unit of an item whose packaging arrangement is indicated in the first packaging record;
train a machine learning model to predict a respective total unit quantity for a plurality of packaging records, wherein the machine learning model comprises a first sub-model and a second sub-model,
wherein the first sub-model is trained using the first labeled data set, wherein output generated by the first sub-model corresponding to an input packaging record comprises a predicted unit measurement category of the input packaging record, wherein the first sub-model comprises a first character-level embedding layer and an attention layer, wherein the attention layer produces an attention vector whose elements indicate respective levels of importance assigned to individual attributes of the input packaging record, and wherein the first sub-model does not include a word-level embedding layer;
wherein the second sub-model is trained using (a) a second labeled data set and (b) unit measurement category predictions generated by the first sub-model, wherein the second labeled data set comprises a subset of the first plurality of packaging records, wherein a label of a particular packaging record of the second labeled data set indicates one or more quantity-indicator strings within a text attribute of the particular packaging record, wherein a price-per-unit of an item whose packaging arrangement is indicated in the particular packaging record is based at least in part on a total unit quantity obtained using the quantity-indicator strings, and wherein the second sub-model identifies, with respect to one or more text attributes of an input packaging record, respective start-index positions and end-index positions for one or more quantity-indicator strings used to determine a total unit quantity for the input packaging record;
store a trained version of the machine learning model; and
cause a predicted price-per-unit corresponding to another packaging record to be presented via one or more programmatic interfaces, wherein the predicted price-per-unit is obtained using output of the trained version of the machine learning model.

2. The system as recited in claim 1, wherein the one or more computing devices include further instructions that upon execution on or across the one or more computing devices further cause the one or more computing devices to:
   train the first sub-model prior to initiating training of the second sub-model; and
   utilize a trained version of the first sub-model to train the second sub-model.

3. The system as recited in claim 1, wherein the one or more computing devices include further instructions that upon execution on or across the one or more computing devices further cause the one or more computing devices to:
   obtain, via one or more programmatic interfaces of an analytics service, an indication of one or more of (a) the set of unit measurement categories or (b) the one or more query types.

4. The system as recited in claim 1, wherein at least one sub-model of the first and second sub-models comprises a convolutional neural network.

5. The system as recited in claim 1, wherein at least one sub-model of the first and second sub-models comprises a softmax layer of a neural network.

6. A computer-implemented method, comprising:
   identifying one or more query types for which responses are to be generated with respect to respective records, wherein individual ones of the records include one or more text attributes, and wherein the one or more query types includes a quantity extraction query type for which at least some records comprise a plurality of quantity-indicator strings;
   training a first machine learning model to extract a respective result for the quantity extraction query type from a plurality of records, wherein the first machine learning model comprises a first sub-model and a second sub-model,
      wherein output generated by the first sub-model corresponding to an input record comprises a predicted unit measurement category corresponding to the input record, wherein the first sub-model comprises a first character-level embedding layer; and
      wherein input of the second sub-model comprises unit measurement category predictions generated as output by the first sub-model, and wherein the second sub-model predicts respective start-index positions and end-index positions for one or more quantity-indicator strings within the input record; and
   storing a trained version of the first machine learning model.

7. The computer-implemented method as recited in claim 6, wherein individual ones of the records indicate a respective grouping arrangement for purchase of an item, and wherein the quantity extraction query type comprises a query for a price-per-unit with respect to an item whose grouping arrangement is indicated in a record.

8. The computer-implemented method as recited in claim 6, further comprising:
   causing, using the trained version of the first machine learning model, results of a search query to be sorted.

9. The computer-implemented method as recited in claim 6, wherein the second sub-model comprises a second character-level embedding layer.

10. The computer-implemented method as recited in claim 6, wherein a text embedding generated in the first machine learning model is language-agnostic, wherein a first training record of a plurality of training records used to train a particular sub-model of the first and second sub-models comprises text in a first language, and wherein a second training record of the plurality of training records comprises text in a second language.

11. The computer-implemented method as recited in claim 6, further comprising:
   obtaining a particular query directed to the trained version of the first machine learning model, wherein the particular query indicates a particular record for which a result is to be obtained;
   causing to be presented, via one or more programmatic interfaces, a predicted unit measurement category corresponding to the particular record, wherein the predicted unit measurement category is generated by the first sub-model of the trained version;
   obtaining, via the one or more programmatic interfaces, a replacement unit measurement category corresponding to the particular record;
   providing, as input to the second sub-model of the trained version, the replacement unit measurement category in place of the predicted unit measurement category; and
   obtaining, using the second sub-model and the replacement unit measurement category, a result of the particular query.

12. The computer-implemented method as recited in claim 6, further comprising:
   obtaining, via one or more programmatic interfaces, a submission request indicating a particular record to be included in a catalog of records, wherein the submission request comprises one or more elements, wherein at least one of the elements comprises a text attribute of the particular record;
   determining, using the trained version of the first machine learning model, that at least one element of the one or more elements comprises an error; and
   causing to be presented, via the one or more programmatic interfaces, an indication of the error.

13. The computer-implemented method as recited in claim 6, further comprising:
   obtaining, via one or more programmatic interfaces, an indication of one or more text attributes of a particular record to be included in a catalog of records;
   determining, using the trained version of the first machine learning model and the one or more text attributes, respective values to be used to populate one or more elements of a catalog submission request corresponding to the particular record; and
   causing to be presented, via the one or more programmatic interfaces, an indication of the respective values.

14. The computer-implemented method as recited in claim 6, wherein the one or more query types comprise a non-quantitative query type, the computer-implemented method further comprising:
   training a second machine learning model to extract a respective result for the non-quantitative query type from a plurality of records, wherein the second machine learning model comprises a third sub-model and a fourth sub-model,
      wherein output generated by the third sub-model corresponding to an input record comprises a non-quantitative extracted-property category corresponding to the input record, wherein the third sub-model comprises a first character-level embedding layer; and
      wherein input of the fourth sub-model comprises non-quantitative property categories generated as output by the third sub-model, and wherein the fourth sub-model predicts respective start-index positions and end-index positions for one or more non-quantitative result indicator strings within the input record; and storing a trained version of the second machine learning model.

15. The computer-implemented method as recited in claim 6, further comprising:

obtaining a training request via one or more programmatic interfaces at an analytics service, wherein the training of the first machine learning model is initiated in response to the training request.

16. One or more non-transitory computer-accessible storage media storing program instructions that when executed on or across one or more processors cause the one or more processors to:

identify one or more query types for which responses are to be generated with respect to respective records, wherein individual ones of the records include one or more text attributes, wherein the one or more query types includes a text interpretation query for which an individual record comprises one or more response-contributor strings, and wherein a result for the text interpretation query with respect to an individual record is based at least in part on an extracted-property class associated with the individual record;

train a machine learning model to extract a respective result for the text interpretation query from a plurality of records, wherein the machine learning model comprises a first sub-model and a second sub-model, wherein output generated by the first sub-model corresponding to an input record comprises a predicted extracted-property class corresponding to the input record, wherein the first sub-model comprises a first character-level embedding layer; and wherein input of the second sub-model comprises extracted property class predictions generated as output by the first sub-model, wherein the second sub-model predicts respective positions of one or more response-contributor strings within the input record; and store a trained version of the machine learning model.

17. The one or more non-transitory computer-accessible storage media as recited in claim 16, storing further program instructions that when executed on or across the one or more processors further cause the one or more processors to:

obtain, via one or more programmatic interfaces, one or more hyper-parameters of the machine learning model.

18. The one or more non-transitory computer-accessible storage media as recited in claim 16, wherein the second sub-model comprises (a) a first neural network to predict start-index positions of the one or more response-contributor strings and (b) a second neural network to predict end-index positions of the one or more response-contributor strings.

19. The one or more non-transitory computer-accessible storage media as recited in claim 16, storing further program instructions that when executed on or across the one or more processors further cause the one or more processors to:

automatically generate at least some labels of a training data set used for training the second sub-model.

20. The one or more non-transitory computer-accessible storage media as recited in claim 16, wherein the second sub-model comprises a multi-dimensional convolutional neural network layer whose output is used to predict, for a particular text interpretation query directed to a particular record, respective spans of a plurality of response-contributor strings.

* * * * *